(12) United States Patent
Watanabe et al.

(10) Patent No.: US 11,412,099 B2
(45) Date of Patent: Aug. 9, 2022

(54) IMAGE READING APPARATUS

(71) Applicant: CANON KABUSHIKI KAISHA, Tokyo (JP)

(72) Inventors: Kiyoshi Watanabe, Chiba (JP); Kazuhisa Okuda, Tokyo (JP); Michiaki Endo, Chiba (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 17/176,947

(22) Filed: Feb. 16, 2021

(65) Prior Publication Data
US 2021/0274056 A1 Sep. 2, 2021

(30) Foreign Application Priority Data

Feb. 27, 2020 (JP) .............................. JP2020-032033

(51) Int. Cl.
H04N 1/04 (2006.01)
H04N 1/00 (2006.01)
H04N 1/203 (2006.01)

(52) U.S. Cl.
CPC ..... H04N 1/00559 (2013.01); H04N 1/00525 (2013.01); H04N 1/00602 (2013.01); H04N 1/00615 (2013.01); H04N 1/00795 (2013.01); H04N 1/00981 (2013.01); H04N 1/2032 (2013.01)

(58) Field of Classification Search
CPC ........... H04N 1/02835; H04N 1/00559; H04N 1/00525; H04N 1/00602; H04N 1/00615; H04N 1/00795; H04N 1/00981; H04N 1/2032

USPC .......... 358/496, 498, 482, 483; 250/234–236
See application file for complete search history.

(56) References Cited

U.S. PATENT DOCUMENTS

| | | | | |
|---|---|---|---|---|
| 5,860,042 A | * | 1/1999 | Tomaru | H04N 1/00519 399/92 |
| 5,986,775 A | * | 11/1999 | Yoshimizu | H04N 1/203 358/496 |
| 7,022,972 B2 | * | 4/2006 | Fukatsu | H04N 1/00551 250/222.1 |
| 7,110,148 B2 | * | 9/2006 | Hasegawa | H04N 1/2032 358/474 |
| 8,384,963 B2 | * | 2/2013 | Kumamoto | G03G 15/5062 358/3.26 |
| 8,411,333 B2 | * | 4/2013 | Yeh | H04N 1/2032 358/475 |
| 8,717,618 B2 | * | 5/2014 | Iguchi | G03G 21/00 358/1.9 |
| 9,204,007 B2 | * | 12/2015 | Maeda | H04N 1/40056 |
| 9,609,161 B1 | * | 3/2017 | Kitamura | H04N 1/00981 |

(Continued)

FOREIGN PATENT DOCUMENTS

JP 2019-098525 6/2019

Primary Examiner — Cheukfan Lee
(74) Attorney, Agent, or Firm — Venable LLP

(57) ABSTRACT

An image reading apparatus includes a first image reading unit, a second image reading unit provided on a side opposite from the first image reading unit with respect to a sheet feeding passage, a first guiding member, a second guiding member, a first unit holding the first image reading unit and the second guiding member, and a second unit holding the second image reading unit and the first guiding member. One of the first unit and the second unit is movable relative to the other unit so as to open the sheet feeding passage.

10 Claims, 10 Drawing Sheets

(56) References Cited

U.S. PATENT DOCUMENTS

| | | | |
|---|---|---|---|
| 9,742,947 B2* | 8/2017 | Tang | H04N 1/00909 |
| 9,939,770 B2* | 4/2018 | Xu | H04N 1/00687 |
| 10,073,414 B2* | 9/2018 | Asano | G03G 21/206 |
| 2005/0213168 A1* | 9/2005 | Chen | H04N 1/203 358/474 |
| 2006/0193015 A1* | 8/2006 | Machida | H04N 1/203 358/474 |
| 2011/0228349 A1* | 9/2011 | Iwayama | H04N 1/00737 358/474 |
| 2011/0273753 A1* | 11/2011 | Yonemura | H04N 1/00631 358/498 |
| 2013/0001050 A1* | 1/2013 | Oshiro | G03G 21/00 198/780 |
| 2013/0235115 A1* | 9/2013 | Nagoshi | B41J 25/001 347/19 |
| 2013/0242360 A1* | 9/2013 | Aikawa | H04N 1/00039 358/504 |
| 2016/0366296 A1* | 12/2016 | Isokawa | G03G 15/6529 |
| 2019/0312982 A1* | 10/2019 | Isokawa | H04N 1/00005 |
| 2021/0314458 A1* | 10/2021 | Sekigawa | H04N 1/2307 |

* cited by examiner

IMAGE READING APPARATUS

FIELD OF THE INVENTION AND RELATED ART

The present invention relates to an image reading apparatus for reading an image on a sheet.

Conventionally, the image reading apparatus in which the image outputted from an image forming apparatus and read by a reading portion and then image defect of the read image is detected has been proposed (Japanese Laid-Open Patent Application (JP-A) 2019-98525). The image reading apparatus includes a first reading portion provided above a sheet feeding passage and for reading an upper image of the sheet and a second reading portion provided below the sheet feeding passage and for reading lower image of the sheet.

In the case where the sheet jams in the sheet feeding passage of the image reading apparatus disclosed in JP-A 2019-98525, as a constitution for removing the jammed sheet, a constitution in which a roller pair provided between the first reading portion and the second reading portion is manually rotated and the sheet is sent downstream with respect to a sheet feeding direction would be considered. However, in the case of such a constitution, there is a need to manually feed the sheet to a discharge opening of the image reading apparatus, so that there arises a problem in terms of a jam clearance property.

SUMMARY OF THE INVENTION

A principal object of the present invention is to provide an image reading apparatus improved in jam clearance property.

Further features of the present invention will become apparent from the following description of exemplary embodiments with reference to the attached drawings.

DESCRIPTION OF THE EMBODIMENTS

Embodiments of the present invention will be specifically described with reference to the drawings. Dimensions, materials, shapes and relative arrangement of constituent elements described in the following embodiments should be appropriately be changed depending on structures and various conditions of apparatuses to which the present invention is applied, and the scope of the present invention is not intended to the limited thereto.

Embodiment 1

[General Structure]

Figure 1:
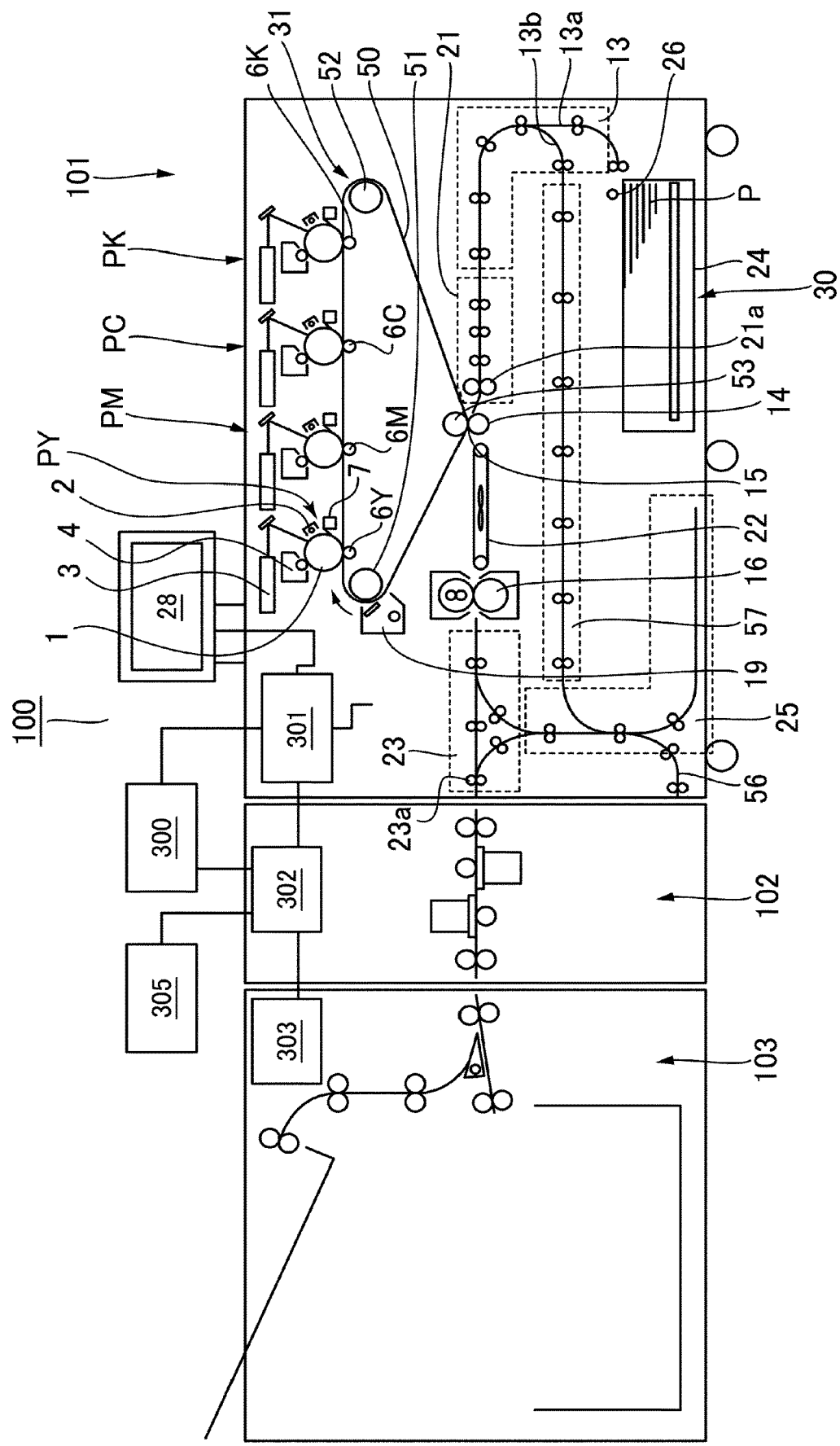
FIG. 1 is a schematic sectional view showing entirety of an image forming system in a first embodiment.

First, a first embodiment of the present invention will be described. An image forming system 100 includes an image forming apparatus 101, an image reading apparatus 102 and a stacking device 103 as shown in FIG. 1. On an upstream side of the image reading apparatus 102 with respect to a sheet feeding direction, the image forming apparatus 101 is connected, and on a downstream side of the image reading apparatus 102 with respect to the sheet feeding direction, the stacking device 103 is connected.

The image forming apparatus 101 is a full-color laser printer of an electrophotographic type and forms an image on a sheet P on the basis of an image signal inputted, to a controller 301, from an information terminal such as a personal computer or from an external device 300 such as an image reader. To the image forming apparatus 101, an operating portion 28 including a liquid crystal panel and various physical buttons and the like is connected. The image forming apparatus 101 is a POD machine capable of meeting printing for purposes other than a general office purpose, and is capable of using, as a recording material (medium), various sheets including paper such as a form or an envelope, glossy paper, a plastic film such as an overhead projector (OHP) sheet, a cloth and the like.

The image forming apparatus 101 includes a feeding unit 30 for feeding the sheet P and an image forming engine 31 for forming an image on the sheet P fed from the feeding unit 30. The image forming engine 31 which is an example of an image forming unit is of a tandem and intermediary transfer type four image forming portions PY, PM, PC and PK for forming toner images of yellow, magenta, cyan and black, respectively and an intermediary transfer belt 50 which is an intermediary transfer member are provided. Each of the image forming portions PY to PK is an electrophotographic unit including a photosensitive drum which is a photosensitive member.

The image forming portions PY to PK are similarly constituted except that colors of toners used for development are different from each other, and therefore, a structure and a toner image forming process (image forming operation) of the image forming portions will be described by using the image forming portion PY as an example. The image forming portion PY includes, in addition to the photosensitive drum 1, a charging device 2, an exposure device 3, a developing device 4 and a drum cleaner 7. The photosensitive drum 1 is a drum-shaped photosensitive member including a photosensitive layer at an outer peripheral portion and rotates in a direction along a rotational direction of the intermediary transfer belt 50. A surface of the photosensitive drum 1 is electrically charged by being supplied with electric charges from the charging device 2.

The exposure device 3 emits laser light modulated depending on image information, so that the surface of the photosensitive drum 1 is scanned with the laser light by an optical system and thus an electrostatic latent image is formed on the surface of the photosensitive drum 1. The developing device 4 accommodates a developer containing the toner and develops the electrostatic latent image into a toner image by supplying the toner to the surface of the photosensitive drum 1. The toner image formed on the photosensitive drum 1 is primary-transferred onto the intermediary transfer belt 50 at a primary transfer portion which is a nip between the intermediary transfer belt 50 and a primary transfer roller 6Y which is a primary transfer device. Residual toner remaining on the photosensitive drum 1 after the transfer is removed by the drum cleaner 7.

The intermediary transfer belt 50 is extended and wound around a driving roller 51, a follower roller 52, an inner secondary transfer roller 53 and primary transfer rollers 6Y to 6K, and is rotationally driven in the clockwise direction in FIG. 1 by the driving roller 51. The image forming operation is performed in the image forming portions in parallel, and the four color toner images are transferred so as to be superposed on each other, so that a full-color toner image is formed on the intermediary transfer belt 50. This toner image is fed to a secondary transfer portion by being carried on the intermediary transfer belt 50. The secondary transfer portion is constituted as a nip as a transfer portion between a secondary transfer roller 14 and the inner secondary transfer roller 53, and the toner image is secondary-transferred onto the sheet P under application of a bias voltage, to the secondary transfer roller 14, of a polarity opposite to a charge polarity of the toner. Residual toner remaining on the intermediary transfer belt 50 after the transfer is removed by a belt cleaner.

The sheet P on which the toner image is transferred is delivered to a fixing unit 16 by a pre-fixing feeding portion 22. The fixing unit 16 includes a fixing roller pair for feeding the sheet P while nipping the sheet P and a heat source such as a halogen heater, and applies heat and pressure to the toner image carried on the sheet P. By this, toner particles are melted and fixed, so that an image fixed on the sheet P is obtained.

Next, a structure and an operation of a sheet feeding system for feeding the sheet P by the feeding unit 30 and for discharging the sheet P, on which the image is formed, to an outside of the image forming apparatus will be described. The sheet feeding system roughly includes the feeding unit 30, a feeding portion 13, an oblique movement correcting portion 21, a branch feeding portion 23, a reverse feeding portion 25 and a double-side feeding portion 57.

The feeding unit 30 includes a feeding cassette 24 for accommodating sheets P, and a pick-up roller 26. The sheet P accommodated in the feeding cassette 24 is fed by the pick-up roller 26. The sheet P fed by the pick-up roller 26 is fed along a feeding path 13a by a feeding roller pair and passes through the feeding portion 13, and then is delivered to the oblique movement correcting portion 21.

The sheet P delivered to the oblique movement correcting portion 21 is fed toward the secondary transfer portion after being subjected to oblique movement correction and timing correction in the oblique movement correcting portion 21. At this time, a registration roller pair 21a of the oblique movement correcting portion 21 sends the sheet P to the secondary transfer portion at timing synchronized with a degree of progression of the image forming operation of the image forming portions PY to PK, on the basis of a detection signal of an unshown registration sensor. The sheet p on which the toner image is transferred in the secondary transfer portion and on which the image is fixed by the fixing unit 16 is fed to the branch feeding portion 23 including an unshown switching member capable of switching a feeding passage of the sheet P. In the case where the image formation on the sheet P is completed, the sheet P is delivered to the image reading apparatus 102 by a discharging roller pair 23a. Further, in the case where the sheet P is turned upside down and then is delivered to the image reading apparatus 102, the sheet P is fed to the discharging roller pair 23a through a reversing path 56.

In the case where the image is formed on a back surface (side) of the recording material P, the sheet P is delivered to the double-side feeding portion 57 through the reverse feeding portion 25. The reverse feeding portion 25 includes a reverse roller pair capable of being rotated normally and reversely and subjects the sheet P to switch-back, and then delivers the sheet P to the double-side feeding portion 57. The double-side feeding portion 57 feeds the sheet P toward the feeding portion 13 through a re-feeding path 13b merging with the feeding path 13a. Then, the image is formed on the back surface of the sheet P, and then the sheet P is delivered to the image reading apparatus 102.

Incidentally, the above-described constitution is an example of the image forming apparatus, and an image forming apparatus including, for example, an image forming means of an ink jet type in place of the electrophotographic type may also be used.

[Stacking Device]

Figure 2:
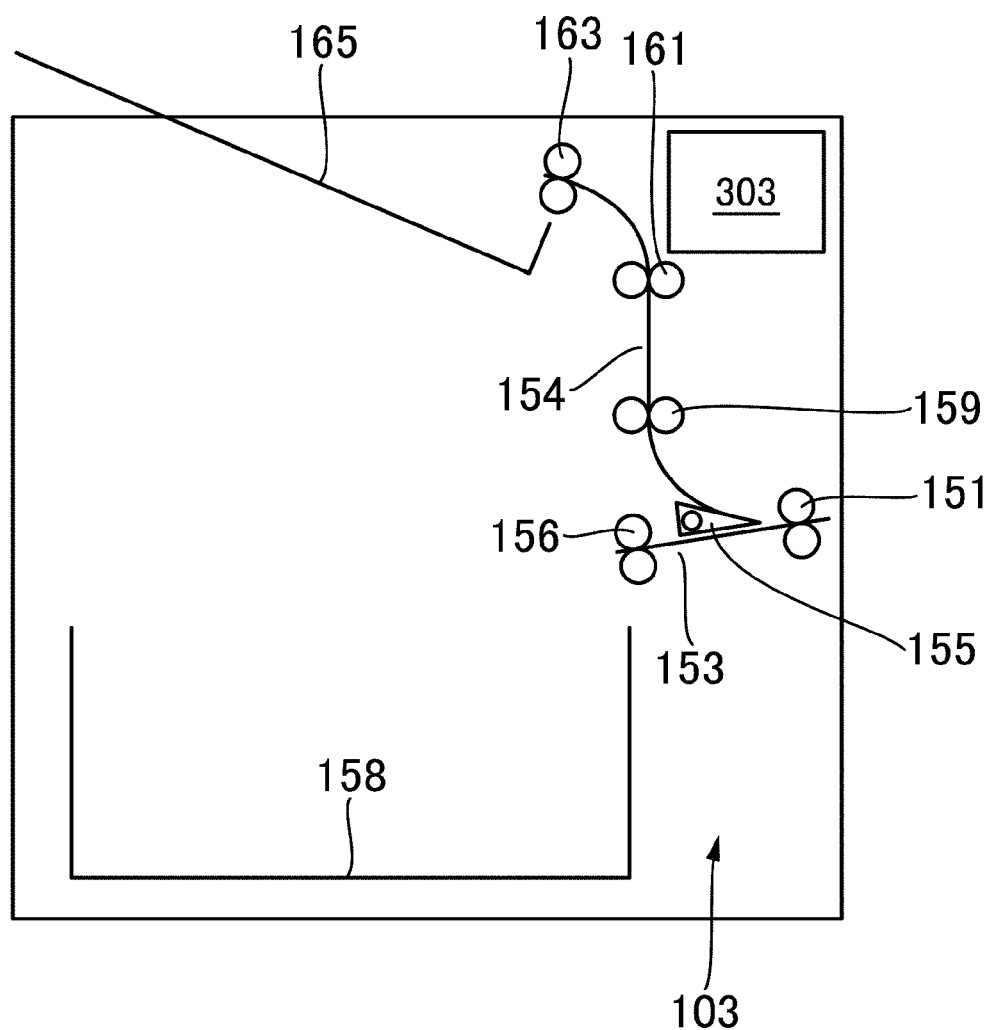
FIG. 2 is a sectional view showing a stacking device.

A structure of the stacking device 103 will be described with reference to FIG. 2. As shown in FIG. 2, the stacking device 103 includes a first discharging path 153, a first discharge tray 158, a second discharging path 154, a second discharge tray 165, a switching member 155, feeding roller pairs 151, 156, 159, 161 and 163, and a controller 303. The controller 303 is connected to a controller 302 (see FIG. 1) of the image reading apparatus 102.

The sheet P delivered from the image reading apparatus 102 is selectively guided to the first discharging path 153 or the second discharging path 154 by the switching member 155. For example, the switching member 155 guides the sheet P to the second discharging path 153 in the case where discrimination that there is no image defect on the image on the sheet P is made by an inspecting process performed on the basis of the image on the sheet P read by the image reading apparatus 102. The sheet P guided to the first discharging path 153 is discharged onto the first discharge tray 158 by the feeding roller pair 156.

On the other hand, in the case where discrimination that the image defect occurs on the image on the sheet P is made by the above-described inspecting process, the switching member 155 guides the sheet P to the second discharging path 154. The sheet P guided to the second discharging path 154 is discharged onto the second discharge tray 165 by the feeding roller pairs 159, 161 and 163.

[Image Reading Apparatus]

Figure 3:
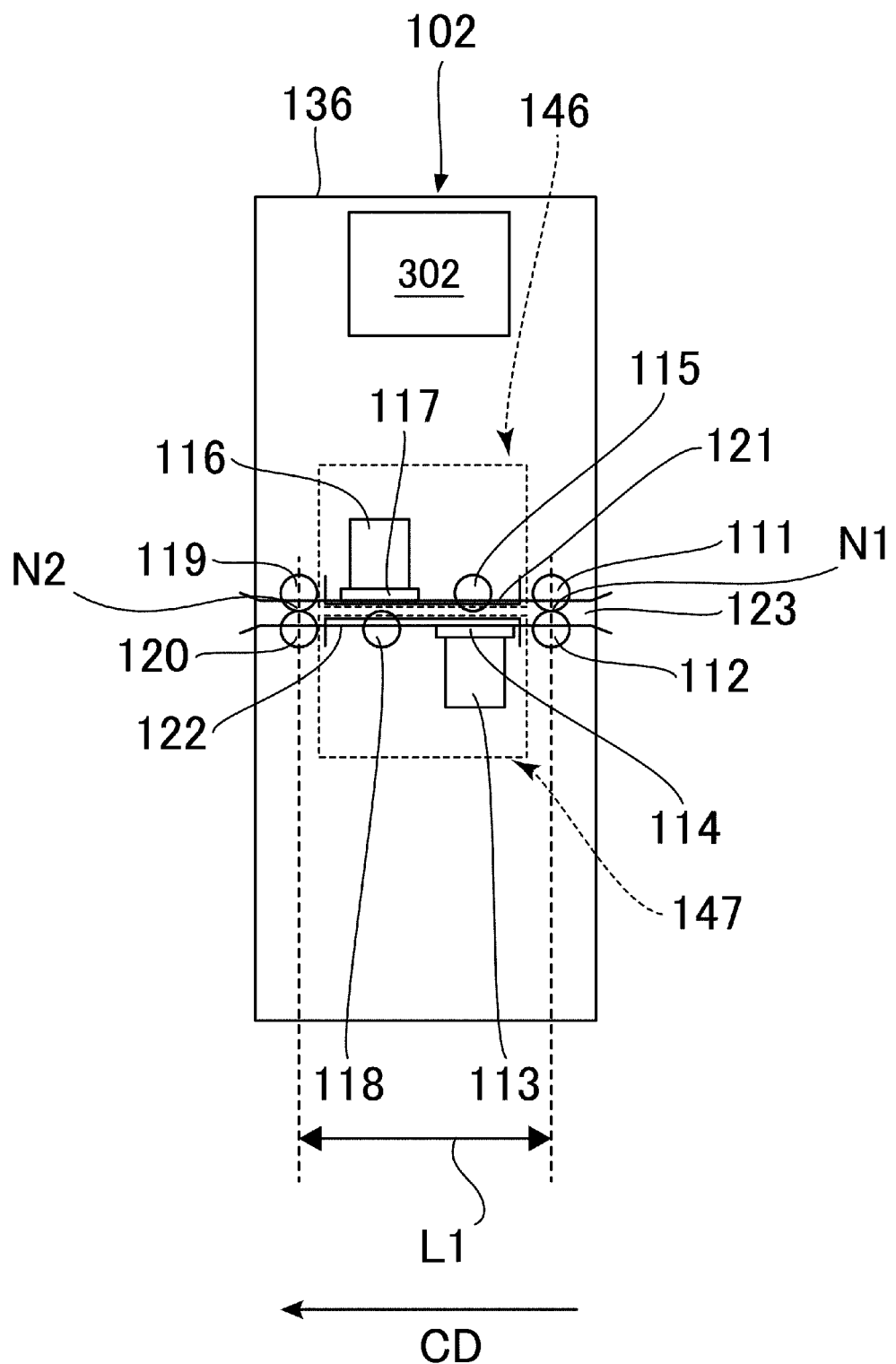
FIG. 3 is a sectional view showing an image reading apparatus.

Next, a structure of the image reading apparatus 102 will be described with reference to FIGS. 3 to 5. As shown in FIG. 3, the image reading apparatus 102 includes an inlet roller pair 111 and 112, an outlet roller pair 119 and 120, an upper feeding guide unit 146, a lower feeding guide unit 147, and the controller 302. The controller 302 is connected to a controller 301 of the image forming apparatus 101, the controller 303 of the stacking device 103, the external device 300 and an inspecting unit 305.

The controller 302 sends, to the inspecting unit 305, the image on the sheet P read by the image reading apparatus 102. Then, the inspecting unit 305 compares data registered in advance or original image data sent to the exposure device 3 of the image forming apparatus 101 with read image data read from the image reading apparatus 102, and then executes the inspecting process for inspecting whether or not the image defect occurs on the sheet P. The image defect of the sheet P includes a contamination deposited on the sheet P, a print error, folding of the sheet P, and the like. The portion for performing the inspecting process is not limited to the inspecting unit 305, but may also be any one of the external device 300 and the controller 301, 302 and 303.

The inlet roller pair 111 and 112 feeds the sheet P, to a downstream side with respect to a sheet feeding direction CD, discharged from the image forming apparatus 101 (see FIG. 1), as shown in FIG. 3. The upper feeding guide unit 146 and the lower feeding guide unit 147 guide the sheet P while reading the images on the sheet P fed by the inlet roller pair 111 and 112. The outlet roller pair 119 and 120 feeds the sheet P, to the downstream side with respect to the sheet feeding direction CD, guided by the upper feeding guide unit 146 and the lower feeding guide unit 147, and then delivers the sheet P to the stacking device 103 (see FIG. 1).

Thus, the inlet roller pair 111 and 112 as a first roller pair is provided upstream of the upper feeding guide unit 146 and the lower feeding guide unit 147 with respect to the sheet feeding direction CD. The outlet roller pair 119 and 120 as a second roller pair is provided downstream of the upper feeding guide unit 146 and the lower feeding guide unit 147 with respect to the sheet feeding direction CD, and discharges the sheet P to an outside of the image reading apparatus 102.

Figure 4:
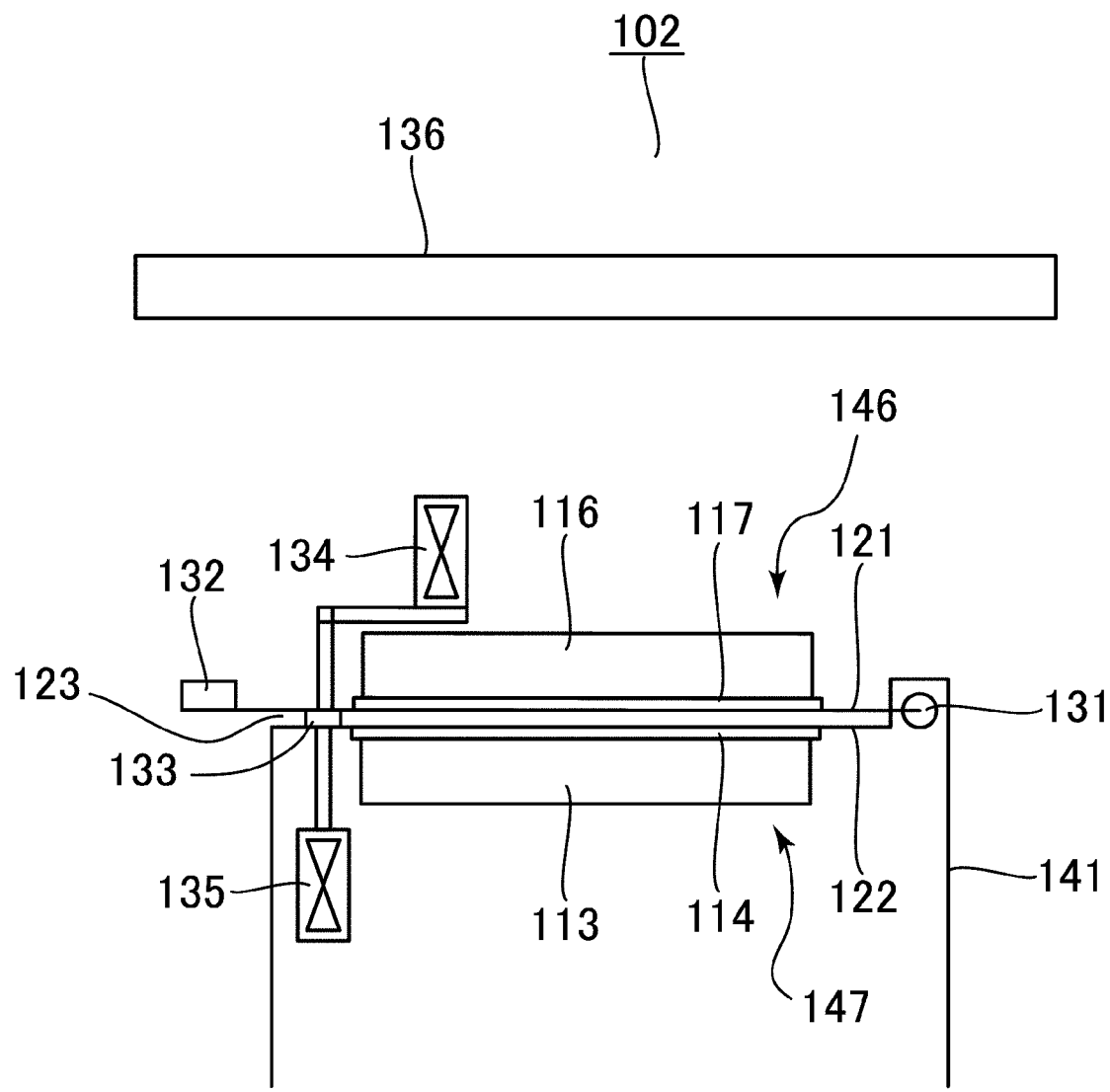
FIG. 4 is a sectional view showing an upper feeding guide unit and a lower feeding guide unit.

The upper feeding guide unit 146 as a first guiding portion includes an upper feeding guide 121, an image reading sensor 116, a platen glass 117, a guiding roller 115 and a cooling fan 134 as shown in FIGS. 3 and 4. The upper feeding guide 121 as a first guiding member guides an upper surface side of the sheet P. The image reading sensor 116 as a first reading portion is supported integrally with the upper feeding guide 121 and reads an image on an upper surface as a first surface of the sheet P.

The platen glass 117 as a transparent member is fixed integrally to the upper feeding guide 121 and includes a transparent portion so as to permit passage of light when the image reading sensor 116 reads the image on the sheet P. The guiding roller 115 is rotatably supported by the upper feeding guide 121 and opposes an image reading sensor 113 described later through the platen glass 114. Further, the guiding roller 115 guides the sheet P so as to be pressed against a platen glass 114 described later, so that image reading accuracy by the image reading sensor 113 is improved. The cooling fan 134 as a first air blowing portion is integrally supported by the upper feeding guide 121 and blows air toward the image reading sensor 116.

The lower feeding guide unit 147 as a second guiding portion includes a lower feeding guide 122, the image reading sensor 113, the platen glass 114, a guiding roller 118 and a cooling fan 135. The lower feeding guide 122 as a second guiding member is provided opposed to the upper feeding guide 121. Further, the lower feeding guide 122 forms a feeding passage 123, through which the sheet P passes, together with the upper feeding guide 121, and guides a lower surface side of the sheet P. The image reading sensor 113 as a second reading portion is integrally supported by the lower feeding guide 122 and reads an image on a lower surface as a second surface opposite from the first surface of the sheet P. Incidentally, the upper feeding guide 121 and the lower feeding guide 122 may only be required so as to at least partially overlap with each other with respect to the sheet feeding direction CD.

The platen glass 114 is fixed integrally to the upper feeding guide 122 and includes a transparent portion so as to permit passage of light when the image reading sensor 113 reads the image on the sheet P. The guiding roller 118 is rotatably supported by the lower feeding guide 122 and guides the sheet P so as to be pressed against a platen glass 117 described later, so that image reading accuracy by the image reading sensor 116 is improved. The cooling fan 135 as a second air blowing portion is integrally supported by the lower feeding guide 122 and blows air toward the image reading sensor 113.

Thus, the sheet P fed along the feeding passage 123 is fed while being subjected to reading of the images on double (both) surface of the sheet P by the upper feeding guide unit 146 and the lower feeding guide unit 147. Incidentally, the image reading sensors 113 and 116 employ a CIS (Contact Image Sensor) in this embodiment, but the present invention is not limited thereto. For example, instead of the CIS, a CCD (Charge Coupled Device) and a CMOS (Complementary Metal-Oxide Semiconductor) may also be employed.

In this embodiment, a roller pair is not provided between the inlet roller pair 111 and 112 and the outlet roller pair 119 and 120, particularly between the image reading sensors 113 and 116 with respect to the sheet feeding direction CD. For this reason, a width of the image reading apparatus 102 with respect to the sheet feeding direction CD can be made small. Further, a distance L1 between a nip N1 between the inlet roller pair 111 and 112 and a nip N2 between the outlet roller pair 119 and 120 is set at a value shorter than a length of a minimum-size sheet capable of being fed by the image reading apparatus 102. Accordingly, the image reading apparatus 102 can be downsized without having an influence on feeding of the sheet P and a feedable sheet size.

[Opening and Closing Constitution of Upper Feeding Guide Unit]

Figure 5:
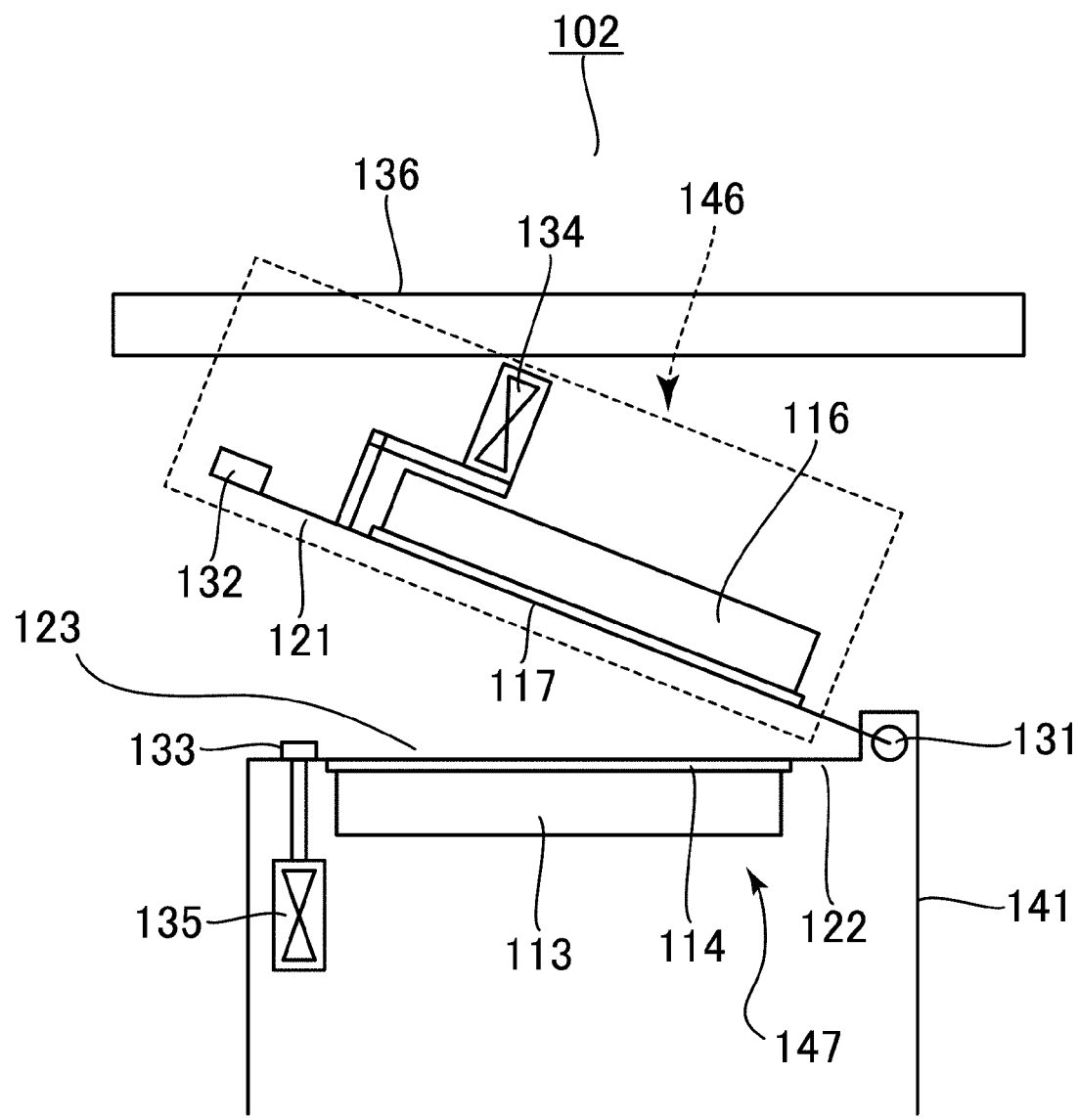
FIG. 5 is a sectional view showing the upper feeding guide positioned in an open position.

The lower feeding guide unit 147 is fixed to a frame 141 of the image reading apparatus 102 as shown in FIGS. 4 and 5. Specifically, to the frame 141, the lower feeding guide 122 is fixed, and by the lower feeding guide 122, the image reading sensor 113, the platen glass 114, the guiding roller 118 (see FIG. 3) and the cooling fan 135 are supported.

On the other hand, the upper feeding guide unit 146 is rotatably supported about a rotation shaft 131 as a first shaft by the frame 141. Specifically, the upper feeding guide 121 is rotatably supported about the rotation shaft 131 by the frame 141. By the upper feeding guide 121, the image reading sensor 116, the platen glass 117, the guiding roller 115 (see FIG. 3) and the cooling fan 134 are supported.

That is, the upper feeding guide unit 146 is constituted so as to be movable between a closed position where the upper feeding guide unit 146 is closed relative to the lower feeding guide unit 147 and constitutes the feeding passage 123 and an open position where the upper feeding guide unit 146 is opened relative to the lower feeding guide unit 147 and opens the feeding passage 123. Further, the upper feeding guide unit 146 is opened upward about the rotation shaft 131 relative to the lower feeding guide unit 147, and thus opens the feeding passage 123.

A user grasps, for example, a handle 132 provided on the upper feeding guide 121 and raises the handle 132, so that the user rotates the upper feeding guide unit 146 from the closed position to the open position. The handle 132 is disposed on a front side of the image reading apparatus 102, and the upper feeding guide unit 146 is opened upward about the rotation shaft 131 disposed on a rear side of the image forming apparatus 102. By this, the feeding passage 123 is opened, and for example, a sheet jammed in the feeding passage 123 can be easily removed, and therefore, a jam clearance property can be improved.

The frame 141 or the lower feeding guide 122 is provided with a positioning member 133 for positioning the upper feeding guide 121 relative to the lower feeding guide 122. In this embodiment, the upper feeding guide 121 is constituted by a steel plate, and a magnet is employed as a material for the positioning member 133. For this reason, the upper feeding guide 121 is attracted to the positioning member 133, so that the upper feeding guide unit 146 can be positioned at the closed position.

In this embodiment, the CIS is used in the image reading sensors 113 and 116. For this reason, the cooling fans 134 and 135 blow air to and cool the image reading sensors 113 and 116 so as not to increase temperatures of the image reading sensors 113 and 116 due to heat generation by light emission of LEDs.

Here, the cooling fan 134 is disposed at an upper end portion of the upper feeding guide unit 146 opened and closed by the user, and a rotation range of the upper feeding guide unit 146 is defined as a range until the cooling fan 134 collides an upper frame 136 of the image reading apparatus 102. The upper frame 136 constitutes a top surface of the image reading apparatus 102, and in the case where a system is constituted by connecting several devices such as the image forming system 100, a height from a floor surface to a feeding path or the top surface of the apparatus if unified in many instances.

In the case where the cooling fan 134 is disposed at the same height, the rotation range of the upper feeding guide unit 146 can be made broader when the cooling fan 134 is disposed at a position closer to the rotation shaft 131. Therefore, in this embodiment, the cooling fan 134 provided in the upper feeding guide unit 146 is disposed at a position closer to the rotation shaft 131 than the cooling fan 135 provided in the lower feeding guide unit 147 is as viewed in an axial direction of the rotation shaft 131, i.e., the sheet feeding direction. By this, the rotation range of the upper feeding guide unit 146 can be made broad, so that the jam clearance property of the sheet jammed in the feeding passage 123 can be improved.

As described above, in this embodiment, the feeding passage 123 can be opened by opening the upper feeding guide unit 146 relative to the lower feeding guide unit 147. For this reason, even when the jam occurs at any position of the feeding passage 123, there is no need to feed the jammed sheet to a discharge opening of the image reading apparatus 102, and the user easily has access to the sheet, so that the jam clearance property can be improved.

Further, the jam clearance is performed in a state in which the upper feeding guide unit 146 is opened, so that as shown in FIG. 3, there is no need to provide a roller pair between the image reading sensors 113 and 116 with respect to the sheet feeding direction CD. For this reason, a distance between the image reading sensors 113 and 116 with respect to the sheet feeding direction CD can be decreased, so that the image reading apparatus 102 can be downsized.

Second Embodiment

Next, a second embodiment of the present invention will be described, but in the second embodiment, only the lower feeding guide unit is constituted so as to be openable and closable. For this reason, constituent elements similar to those in the first embodiment will be described by being omitted from illustration or being represented by the same reference numerals or symbols in the drawings.

Figure 6:
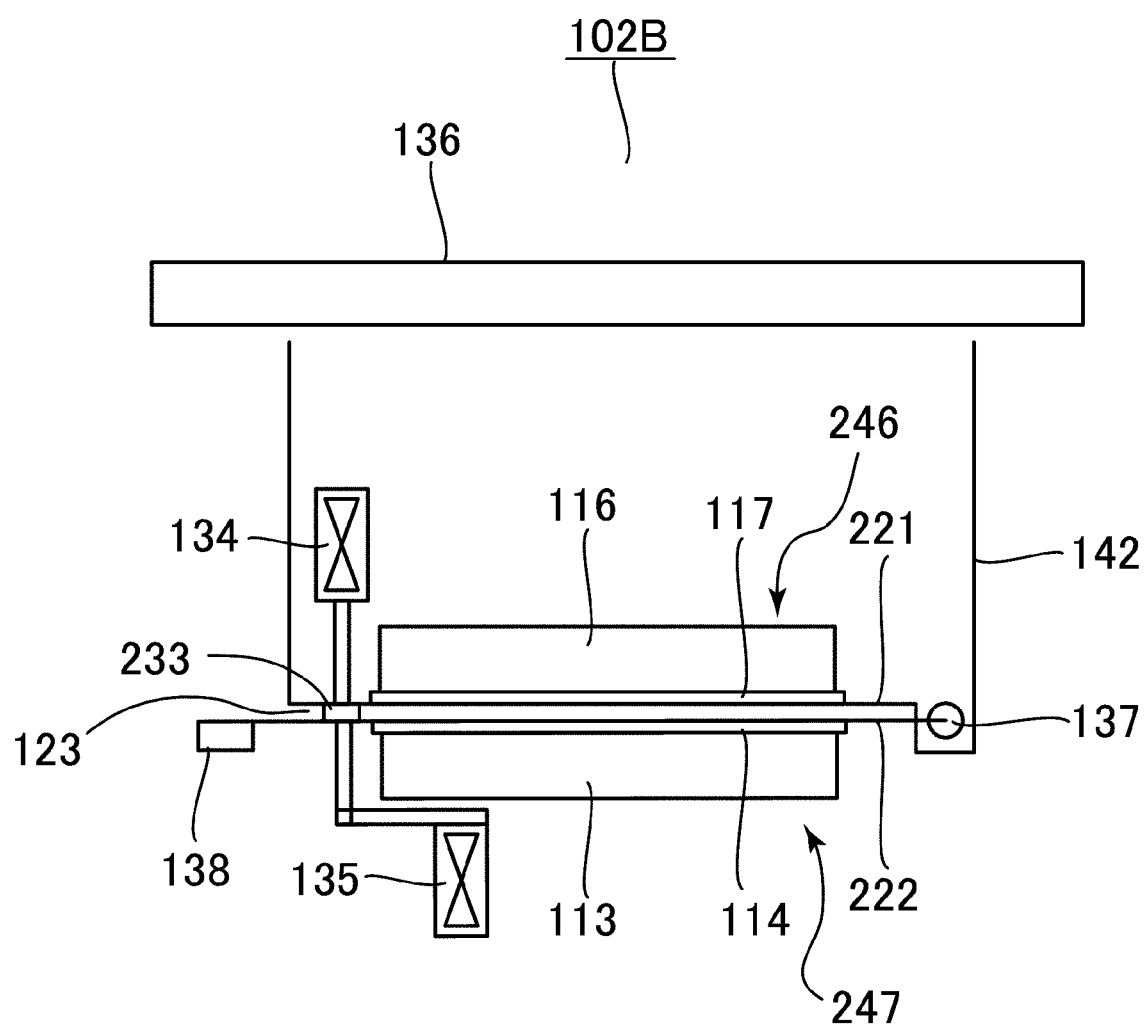
FIG. 6 is a sectional view showing an upper feeding guide unit and a lower feeding guide unit in a second embodiment.

As shown in FIGS. 3 and 6, an image reading apparatus 102B of this embodiment includes an inlet roller pair 111 and 112, an outlet roller pair 119 and 120, an upper feeding guide unit 246, a lower feeding guide unit 247, and the controller 302. The upper feeding guide unit 246 includes an upper feeding guide 221, an image reading sensor 116, a platen glass 117, a guiding roller 115 and a cooling fan 134.

The upper feeding guide 221 is fixed to a frame 142 of the image reading apparatus 102B and guides an upper surface side of the sheet P. For this reason, the upper feeding guide unit 246 is provided so as to be immovable.

The lower feeding guide unit 247 includes a lower feeding guide 222, the image reading sensor 113, the platen glass 114, a guiding roller 118 and a cooling fan 135. The lower feeding guide 222 as is provided opposed to the upper feeding guide 221, and forms a feeding passage 123, through which the sheet P passes, together with the upper feeding guide 221. Incidentally, the upper feeding guide 221 and the lower feeding guide 222 may only be required so as to at least partially overlap with each other with respect to the sheet feeding direction CD.

Figure 7:
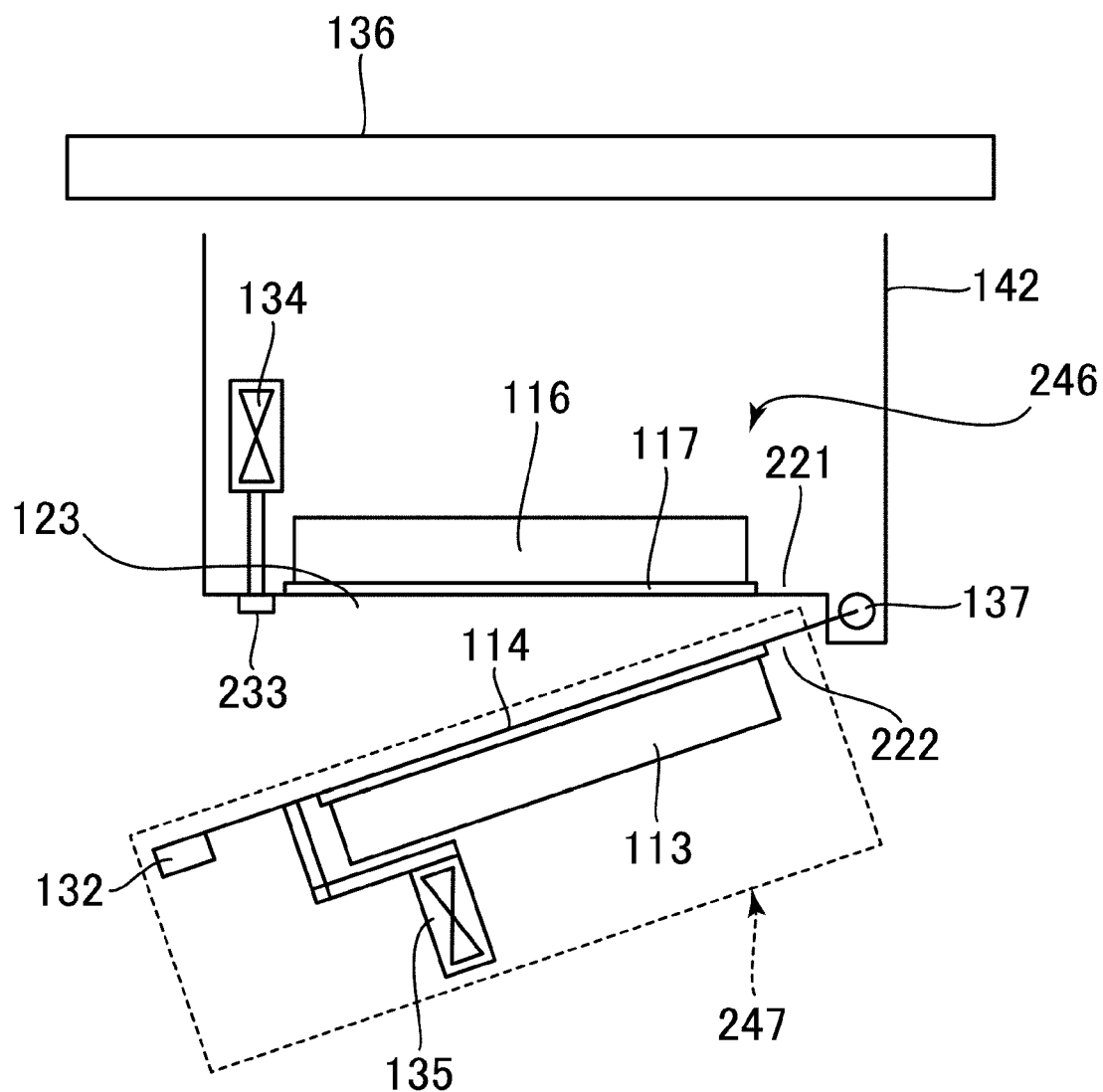
FIG. 7 is a sectional view showing the lower feeding guide unit positioned in an open position.

The lower feeding guide unit 247 is rotatably supported about a rotation shaft 137 by the frame 142 as shown in FIGS. 6 and 7. Specifically, the lower feeding guide 222 is rotatably supported about the rotation shaft 137 by the frame 142. By the lower feeding guide 222, the image reading sensor 113, the platen glass 114, the guiding roller 118 (see FIG. 3) and the cooling fan 135 are supported.

That is, the lower feeding guide unit 247 is constituted so as to be movable between a closed position where the lower feeding guide unit 247 is closed relative to the upper feeding guide unit 246 and constitutes the feeding passage 123 and an open position where the lower feeding guide unit 247 is opened relative to the upper feeding guide unit 246 and opens the feeding passage 123. Further, the lower feeding guide unit 247 is opened downward about the rotation shaft 137 relative to the upper feeding guide unit 246, and thus opens the feeding passage 123.

A user grasps, for example, a handle 138 provided on the lower feeding guide 222 and presses down the handle 138, so that the user rotates the lower feeding guide unit 247 from the closed position to the open position. The handle 138 is disposed on a front side of the image reading apparatus 102B, and the lower feeding guide unit 237 is opened downward about the rotation shaft 137 disposed on a rear side of the image reading apparatus 102B. By this, the feeding passage 123 is opened, and for example, a sheet jammed in the feeding passage 123 can be easily removed, and therefore, a jam clearance property can be improved.

The frame 142 or the upper feeding guide 221 is provided with a positioning member 233 for positioning the lower feeding guide 222 relative to the upper feeding guide 221. In this embodiment, the lower feeding guide 222 is constituted by a steel plate, and a magnet is employed as a material for the positioning member 233. For this reason, the lower feeding guide 222 is attracted to the positioning member 233, so that the upper feeding guide unit 247 can be positioned at the closed position.

Further, the cooling fan 135 is disposed at an upper end portion of the lower feeding guide unit 247 opened and closed by the user, and a rotation range of the lower feeding guide unit 247 is defined as a range until the cooling fan 135 collides a lower frame of the image reading apparatus 102.

In the case where the cooling fan 135 is disposed at the same height, the rotation range of the lower feeding guide unit 247 can be made broader when the cooling fan 135 is disposed at a position closer to the rotation shaft 137. Therefore, in this embodiment, the cooling fan 135 provided in the lower feeding guide unit 247 is disposed at a position closer to the rotation shaft 137 than the cooling fan 134 provided in the upper feeding guide unit 246 is as viewed in an axial direction of the rotation shaft 137, i.e., the sheet feeding direction. By this, the rotation range of the lower feeding guide unit 247 can be made broad, so that the jam clearance property of the sheet jammed in the feeding passage 123 can be improved.

As described above, in this embodiment, the feeding passage 123 can be opened by opening the lower feeding guide unit 247 relative to the upper feeding guide unit 246. For this reason, even when the jam occurs at any position of the feeding passage 123, there is no need to feed the jammed sheet to a discharge opening of the image reading apparatus 102B, and the user easily has access to the sheet, so that the jam clearance property can be improved.

Further, the jam clearance is performed in a state in which the lower feeding guide unit 247 is opened, so that as shown in FIG. 3, there is no need to provide a roller pair between the image reading sensors 113 and 116 with respect to the sheet feeding direction CD. For this reason, a distance between the image reading sensors 113 and 116 with respect to the sheet feeding direction CD can be decreased, so that the image reading apparatus 102B can be downsized.

Incidentally, in this embodiment, the lower feeding guide unit 247 provided so as to be openable and closable corresponds to the first guiding portion. Further, the lower feeding guide 222, the image reading sensor 113 and the platen glass 114 of the lower feeding guide unit 247 correspond to the first guiding member, the first reading portion and the transparent member, respectively. Further, the upper feeding guide unit 246 corresponds to the second guiding portion, and the upper feeding guide 221 and the image reading sensor 116 of the upper feeding guide unit 246 correspond to the second guiding member and the second reading portion, respectively.

Third Embodiment

Next, a third embodiment of the present invention will be described, but in this embodiment, both the upper feeding guide unit and the lower feeding guide unit are constituted so as to be openable and closable. For this reason, constituent elements similar to those in the first embodiment will be described by being omitted from illustration or being represented by the same reference numerals or symbols in the drawings.

Figure 8:
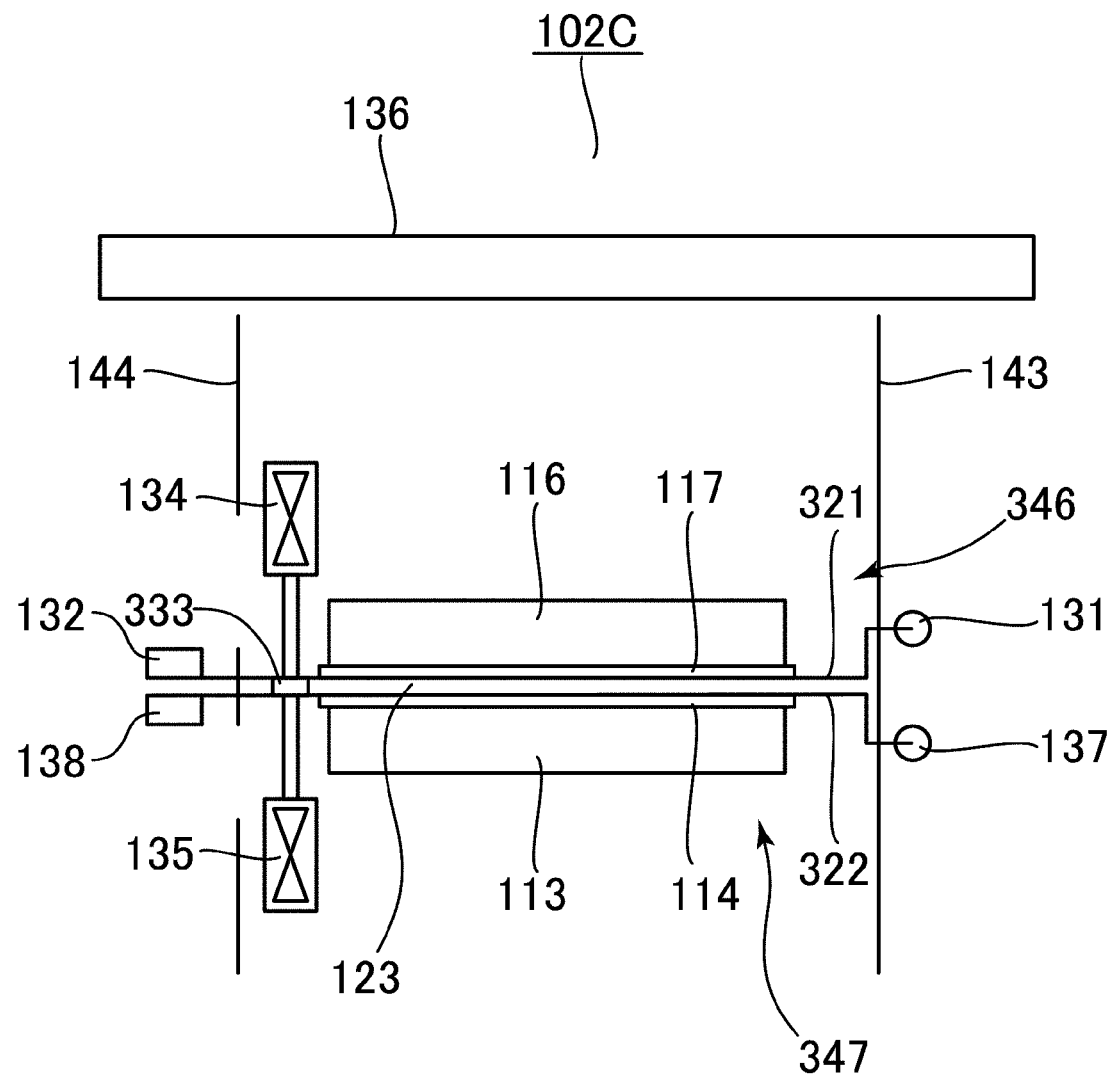
FIG. 8 is a sectional view showing an upper feeding guide unit and a lower feeding guide unit in a third embodiment.

As shown in FIGS. 3 and 8, an image reading apparatus 102C of this embodiment includes an inlet roller pair 111 and 112, an outlet roller pair 119 and 120, an upper feeding guide unit 346, a lower feeding guide unit 347, and the controller 302. The upper feeding guide unit 346 as the first guiding portion includes an upper feeding guide 321 an image reading sensor 116, a platen glass 117, a guiding roller 115 and a cooling fan 134.

Figure 9:
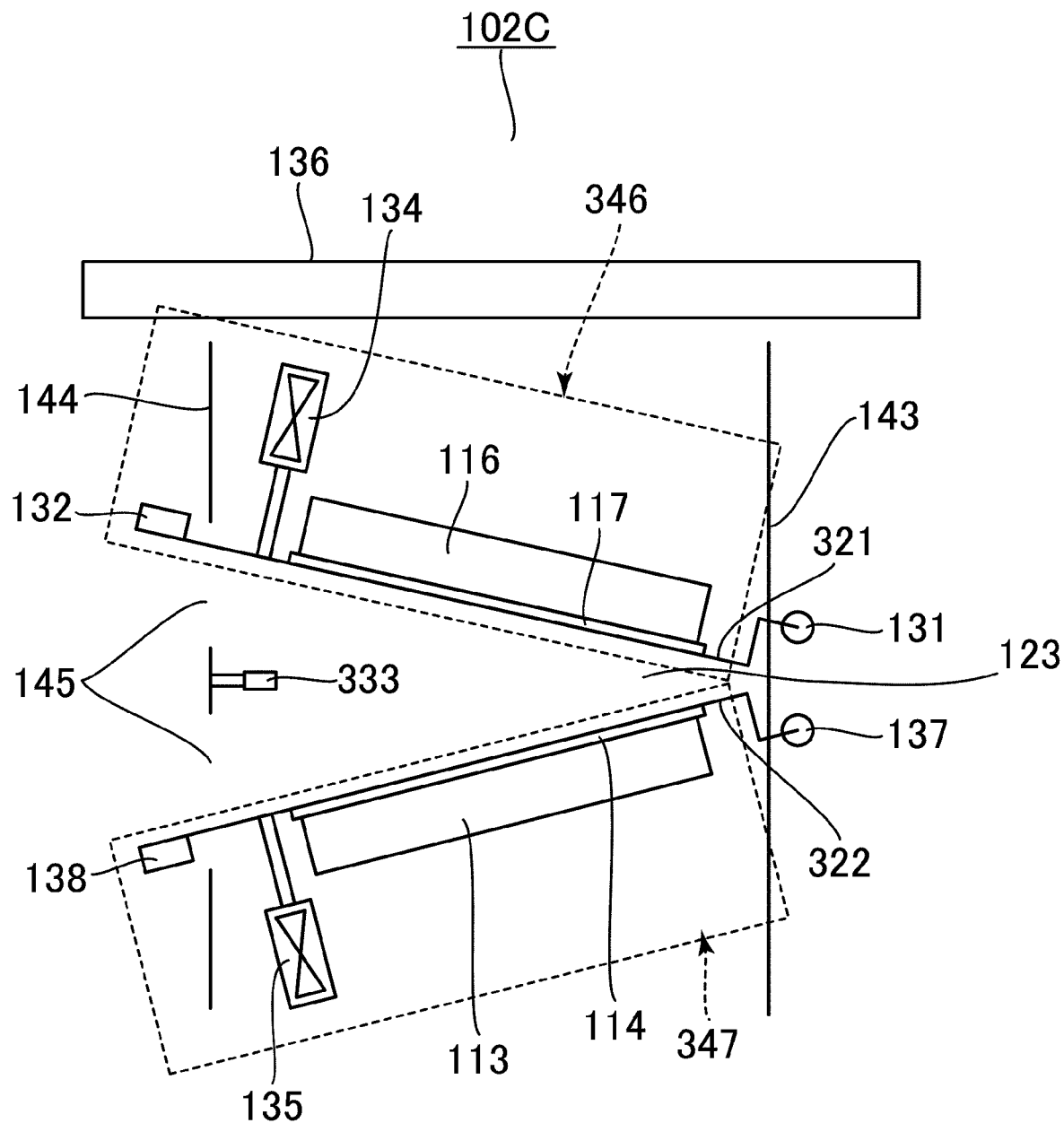
FIG. 9 is a sectional view showing the upper feeding guide unit positioned in an open position and the lower feeding guide unit positioned in an open position.

The upper feeding guide unit 346 is rotatably supported about a rotation shaft 131 by a rear frame 143 as shown in FIGS. 8 and 9. Specifically, the upper feeding guide 321 is rotatably supported about the rotation shaft 131 by the rear frame 143. By the upper feeding guide 321, the image reading sensor 116, the platen glass 117, the guiding roller 115 (see FIG. 3) and the cooling fan 134 are supported.

That is, the upper feeding guide unit 346 is constituted so as to be movable between a closed position where the upper feeding guide unit 346 is closed relative to the lower feeding guide unit 347 and constitutes the feeding passage 123 and an open position where the upper feeding guide unit 346 is opened relative to the lower feeding guide unit 347 and opens the feeding passage 123. Further, the upper feeding guide unit 346 is opened upward about the rotation shaft 131 relative to the lower feeding guide unit 347, and thus opens the feeding passage 123.

The lower feeding guide unit 347 as the second guiding portion is rotatably supported about the rotation shaft 137 as a second shaft parallel to the rotation shaft 131 by the rear frame 143. Specifically, the upper feeding guide 322 is rotatably supported about the rotation shaft 137 by the rear frame 143, and by the lower feeding guide 322, the image reading sensor 113, the platen glass 114, the guiding roller 118 and the cooling fan 135 are supported.

That is, the lower feeding guide unit 347 is constituted so as to be movable between a closed position where the lower feeding guide unit 347 is closed relative to the upper feeding guide unit 346 and constitutes the feeding passage 123 and an open position where the lower feeding guide unit 347 is opened relative to the upper feeding guide unit 346 and opens the feeding passage 123. Further, the upper feeding guide unit 347 is opened downward about the rotation shaft 137 relative to the upper feeding guide unit 346, and thus opens the feeding passage 123.

The user grasps, for example, the handle 132 provided on the upper feeding guide 321 and raises the handle 132, so that the unit rotates the upper feeding guide unit 346 from the closed position to the open position. The handle 132 is disposed on the front side of the image reading apparatus 102C, and the upper feeding guide unit 347 is opened upward about the rotation shaft 131 disposed on the rear side of the image reading apparatus 102C.

Further, a user grasps, for example, a handle 138 provided on the lower feeding guide 322 and presses down the handle 138, so that the user rotates the lower feeding guide unit 347 from the closed position to the open position. The handle 138 is disposed on a front side of the image reading apparatus 102C, and the lower feeding guide unit 347 is opened downward about the rotation shaft 137 disposed on a rear side of the image reading apparatus 102C. Thus, the feeding passage 123 is largely opened by opening both the upper feeding guide unit 346 and the lower feeding guide unit 347, so that the user has access to the feeding passage 123 through an opening portion 145 provided in the front frame 144. By this, the feeding passage 123 is opened, and for example, a sheet jammed in the feeding passage 123 can be easily removed, and therefore, a jam clearance property can be improved. Incidentally, when the user opens the feeding passage 123, the user is not necessarily required to open both the upper feeding guide unit 346 and the lower feeding guide unit 347, but may also open either one of these units.

The front frame 144 of the image reading apparatus 102C is provided with a positioning member 333 for positioning the upper feeding guide 321 and the lower feeding guide 322 relative to the front frame 144. In this embodiment, the upper feeding guide 321 and the lower feeding guide 322 are constituted by a steel plate, and a magnet is employed as a material for the positioning member 333. For this reason, the upper feeding guide 321 and the lower feeding guide 322 are attracted to the positioning member 333, so that the upper feeding guide unit 346 and the upper feeding guide unit 347 can be positioned at the closed position.

Further, the cooling fan 135 is disposed at an upper end portion of the lower feeding guide unit 247 opened and closed by the user, and a rotation range of the lower feeding guide unit 247 is defined as a range until the cooling fan 135 collides a lower frame of the image reading apparatus 102.

As described above, in this embodiment, the feeding passage 123 can be opened by opening at least one of the upper feeding guide unit 346 and the lower feeding guide unit 347 relative to the upper feeding guide unit 246. For this reason, even when the jam occurs at any position of the feeding passage 123, there is no need to feed the jammed sheet to a discharge opening of the image reading apparatus 102C, and the user easily has access to the sheet, so that the jam clearance property can be improved.

Further, the jam clearance is performed in a state in which at least one of the upper feeding guide unit 346 and the lower feeding guide unit 347 is opened, so that as shown in FIG. 3, there is no need to provide a roller pair between the image reading sensors 113 and 116 with respect to the sheet feeding direction CD. For this reason, a distance between the image reading sensors 113 and 116 with respect to the sheet feeding direction CD can be decreased, so that the image reading apparatus 102C can be downsized.

Fourth Embodiment

Next, a fourth embodiment of the present invention will be described, but in the fourth embodiment, only the lower feeding guide unit is constituted so that an inner roller and an outer roller are provided in each of the upper feeding guide unit and the lower feeding guide unit. For this reason, constituent elements similar to those in the first embodiment will be described by being omitted from illustration or being represented by the same reference numerals or symbols in the drawings.

Figure 10:
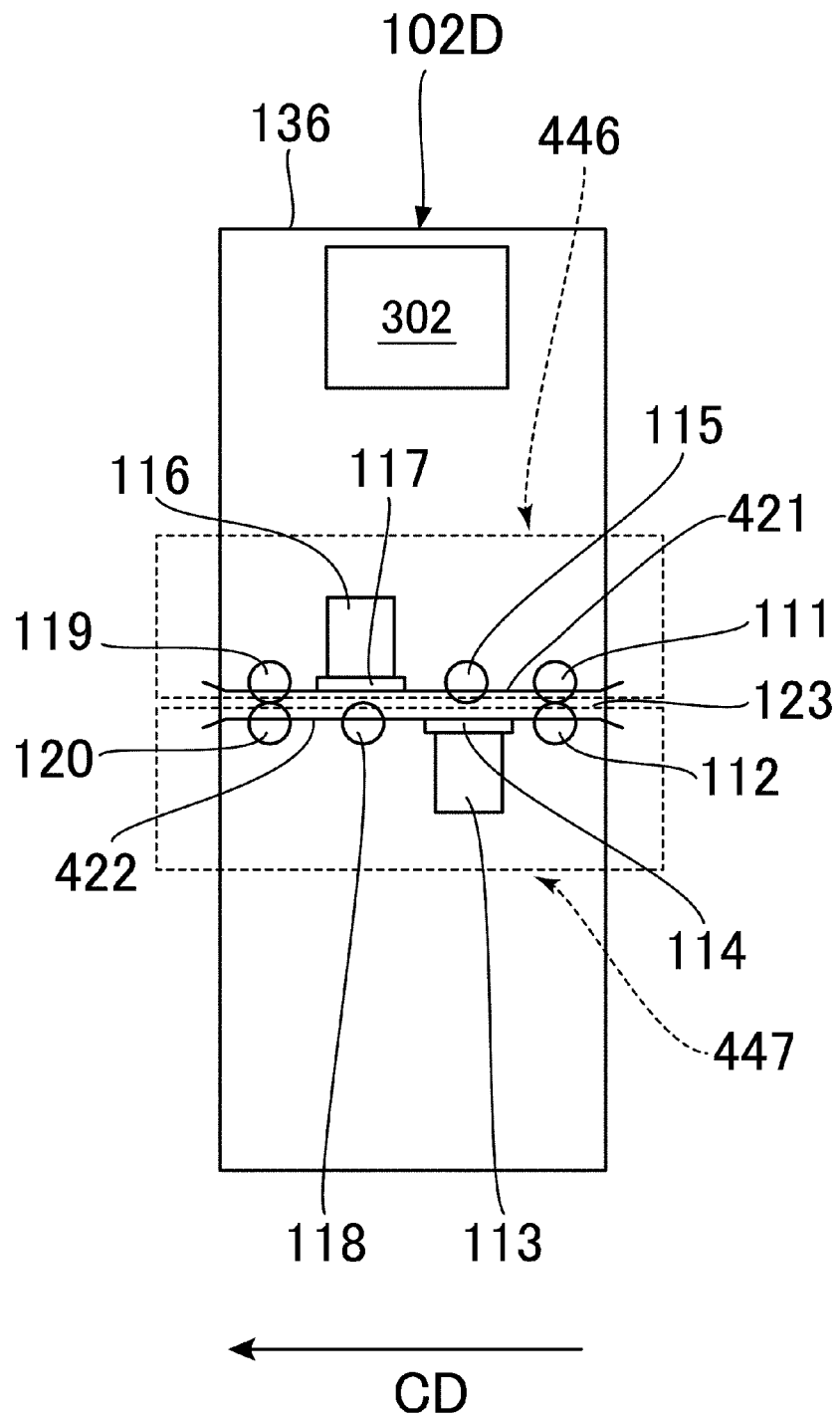
FIG. 10 is a sectional view showing an image reading apparatus in a fourth embodiment.

As shown in FIG. 10, an image reading apparatus 102D of this embodiment includes an upper feeding guide unit 446, a lower feeding guide unit 447, and the controller 302. The upper feeding guide unit 446 includes an upper feeding guide 421, an image reading sensor 116, a platen glass 117, a guiding roller 115 and a cooling fan 134 (see FIG. 8), an inlet roller 111 and an outlet roller 119.

The inlet roller 111 and the outlet roller 119 are rotatably supported by the upper feeding guide 421. In other words, the inlet roller 111 which is one roller of an inlet roller pair and the outlet roller 119 which is one roller of an outlet roller pair are rotatably supported by the upper feeding guide 421 as the first guiding member.

The lower feeding guide 447 includes a lower feeding guide 422, the image reading sensor 113, the platen glass 114, a guiding roller 118, a cooling fan 135 (see FIG. 8), an inlet roller 112 and an outlet roller 120. The inlet roller 112 and the outlet roller 120 are rotatably supported by the lower feeding guide 422. Further, the inlet rollers 111 and 112 constitute the inlet roller pair, and the outlet rollers 119 and 120 constitute the outlet roller pair.

In this embodiment, at least one of the upper feeding guide unit 446 and the lower feeding guide unit 447 may only be required to be constituted so as to be openable and closable, and the opening and closing constitution of these upper and lower feeding guide units is as described above in the first to third embodiments.

As described above, in this embodiment, at least one of the upper feeding guide unit 446 and the lower feeding guide unit 447 is opened, so that in addition to the feeding passage 123, it is possible to open nips of the inlet roller pair 111 and 112 and the outlet roller pair 119 and 120. For this reason, the jam clearance property of the sheet jammed in the feeding passage can be improved.

Further, the jam clearance is performed in a state in which at least one of the upper feeding guide unit 446 and the lower feeding guide unit 447 is opened, so that as shown in FIG. 3, there is no need to provide a roller pair between the image reading sensors 113 and 116 with respect to the sheet feeding direction CD. For this reason, a distance between the image reading sensors 113 and 116 with respect to the sheet feeding direction CD can be decreased, so that the image reading apparatus 102D can be downsized.

Other Embodiments

Incidentally, in the first and third embodiments, the upper feeding guides 121 and 321 are rotatably supported about the rotation shaft 131, but the present invention is not limited thereto. For example, between the rotation shaft 131 and each of the upper feeding guides 121 and 321, another member may also be interposed. Further, the upper feeding guides 121 and 321 may also be provided slidably (movably) upward so as to open the feeding passage 123.

Similarly, in the embodiment and third embodiments, the lower feeding guides 222 and 322 are rotatably supported about the rotation shaft 137, but the present invention is not limited thereto. For example, between the rotation shaft 137 and each of the lower feeding guides 222 and 322, another member may also be interposed. Further, the lower feeding guides 222 and 322 may also be provided slidably (movably) downward so as to open the feeding passage 123.

Further, the first to fourth embodiments may also be combined arbitrarily.

Even in either embodiment, to each of the image reading apparatuses 102, 102B, 102C and 102D, the image forming apparatus 101 is connected, but the present invention is not limited thereto. For example, between the image forming apparatus 101 and each of the image reading apparatuses 102, 102B, 102C and 102D, another apparatus such as a decurling apparatus for rectifying a curl of the sheet may also be interposed.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2020-032033 filed on Feb. 27, 2020, which is hereby incorporated by reference herein in its entirety.

What is claimed is:

1. An image reading apparatus for receiving a sheet fed from an image forming apparatus and for reading an image on the sheet, said image reading apparatus comprising:
    a first reading unit configured to read an image on a first surface of the sheet fed from the image forming apparatus;
    a second reading unit configured to read an image on a second surface of the sheet fed from the image forming apparatus, at an image reading position different from an image reading position of said first reading unit, said second reading unit being provided on a side opposite from said first reading unit with respect to a sheet feeding passage;
    a first guiding member provided at a position opposing the image reading position of said second reading unit and configured to form a part of the sheet feeding passage;
    a second guiding member provided at a position opposing the image reading position of said first reading unit and configured to form a part of said sheet feeding passage;
    a first air blowing fan configured to blow air toward said first reading unit
    a second air blowing fan configured to blow air toward said second reading unit:

a first unit including said first reading unit, said first guiding member and said first air blowing fan; and a second unit including said second reading unit, said second guiding member and said second air blowing fan, wherein said first unit is rotatable about a first shaft relative to said second unit so as to open the sheet feeding passage, and wherein said first air blowing fan is provided at a position closer to said first shaft than said second air blowing fan is as viewed in an axial direction of said first shaft.

2. An image reading apparatus according to claim 1, further comprising a frame supporting said second unit, wherein said first unit is rotatable relative to said frame.

3. An image reading apparatus according to claim 1, wherein said first unit opens the sheet feeding passage by being opened upward about the first shaft relative to said second unit.

4. An image reading apparatus according to claim 1, wherein said first unit further comprises:

a platen glass configured to permit passage of light when said first reading unit reads the image on the sheet; and a guiding roller rotatably supported by said first guiding member and opposing said second reading unit.

5. An image reading apparatus according to claim 1, further comprising:

an inlet roller pair provided upstream of said first reading unit and said second reading unit with respect to the sheet feeding direction and configured to receive the sheet discharged from the image forming apparatus; and an outlet roller pair provided downstream of said first reading unit and said second reading unit with respect to the sheet feeding direction and configured to discharge the sheet to an outside of said image reading apparatus.

6. An image reading apparatus according to claim 5, wherein a distance between a nip of said inlet roller pair and a nip of said outlet roller pair with respect to the sheet feeding direction is shorter than a length of a minimum-size sheet.

7. An image reading apparatus according to claim 5, wherein one of said inlet roller pair and one of said outlet roller pair are rotatably supported by said first guiding member.

8. An image forming apparatus according to Claim 1, wherein said second unit is rotatably supported about a second shaft parallel to said first shaft relative to said first unit.

9. An image reading apparatus according to claim 1, wherein said first air blowing fan is disposed above said first reading unit.

10. An image forming system comprising:

an image forming apparatus configured to form an image on a sheet;

a first reading unit configured to read an image on a first surface of the sheet fed from the image forming apparatus;

a second reading unit configured to read an image on a second surface of the sheet fed from the image forming apparatus, at an image reading position different from an image reading position of said first reading unit, said second reading unit being provided on a side opposite from said first reading unit with respect to a sheet feeding passage;

a first guiding member provided at a position opposing the image reading position of said second reading unit and configured to form a part of the sheet feeding passage;

a second guiding member provided at a position opposing the image reading position of said first reading unit and configured to form a part of said sheet feeding passage;

a first air blowing fan configured to blow air toward said first reading unit;

a second air blowing fan configured to blow air toward said second reading unit;

a first unit holding said first reading unit, said first guiding member and said first air blowing fan; and a second unit holding said second reading unit, said second guiding member and said second air blowing fan, wherein said first unit is rotatable about a first shaft relative to said second unit so as to open the sheet feeding passage, and wherein said first air blowing fan is provided at a position closer to said first shaft than said second air blowing fan is as viewed in an axial direction of said first shaft.

* * * * *